C. S. & B. M. AGRE.
WINDMILL.
APPLICATION FILED JULY 14, 1910.
999,188.
Patented July 25, 1911.
3 SHEETS—SHEET 2.
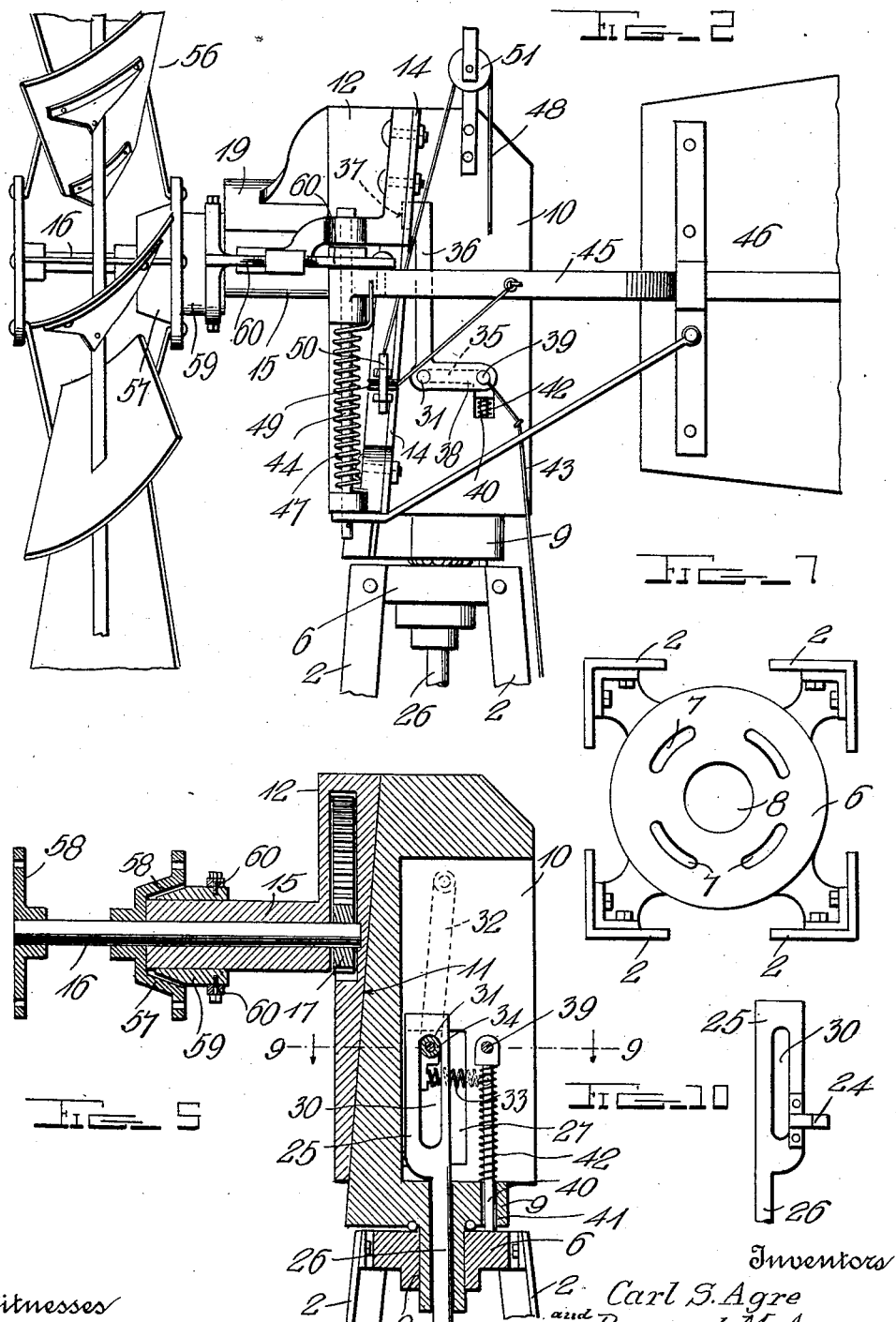
Witnesses
C. Carpenter
O. B. Hopkins
Inventors
Carl S. Agre
Bernard M. Agre
by H. B. Willson & Co.
Attorneys

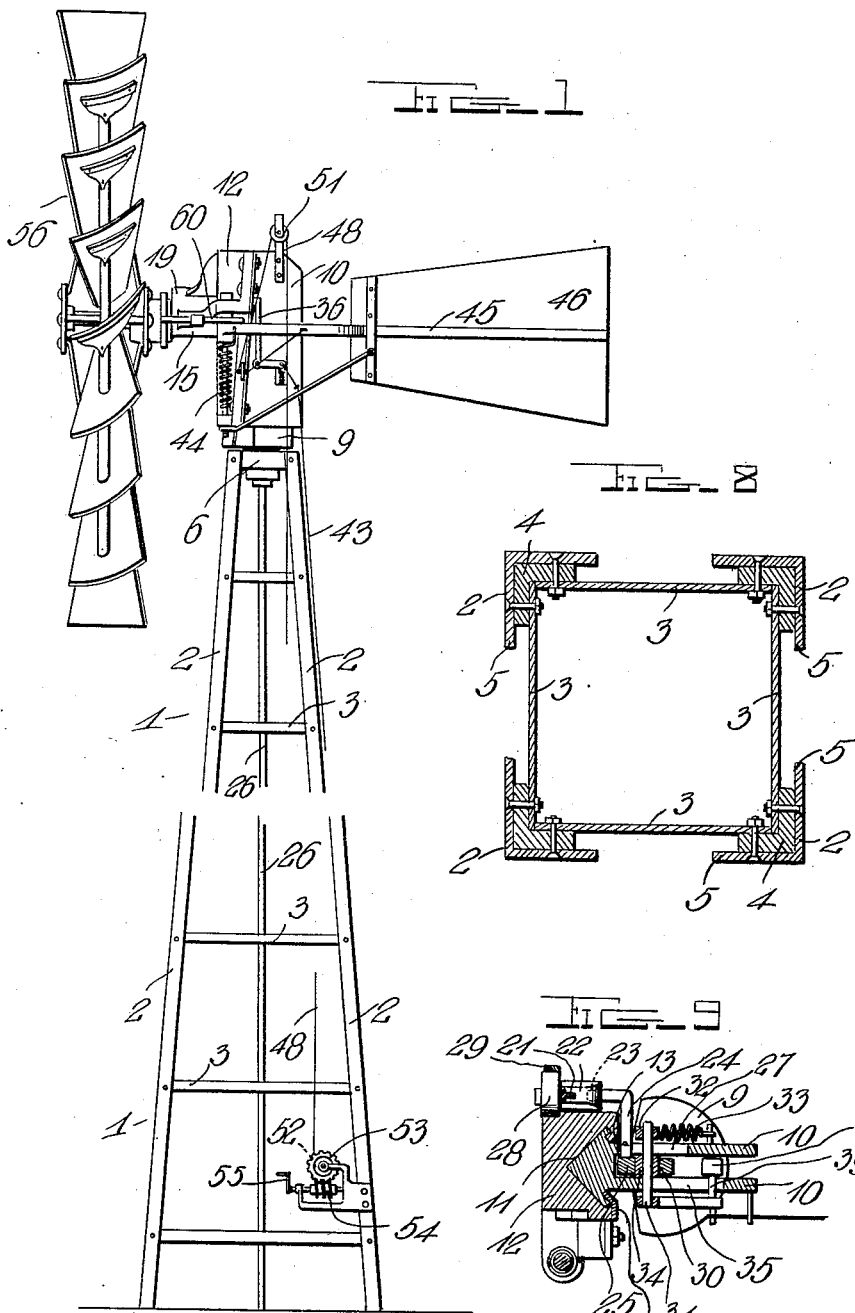

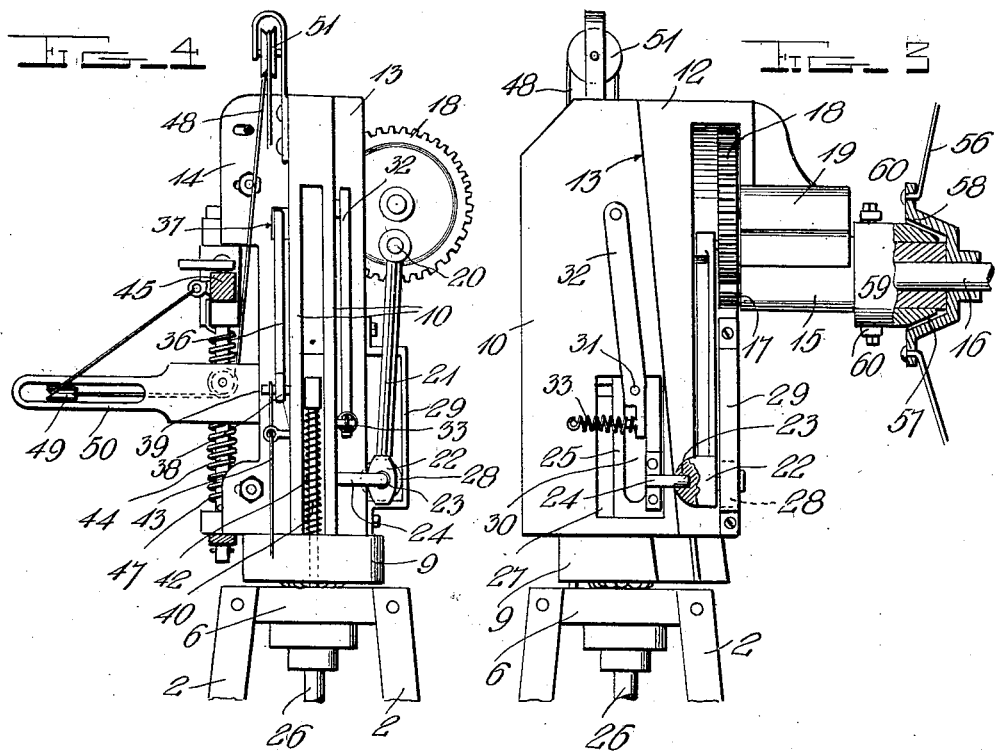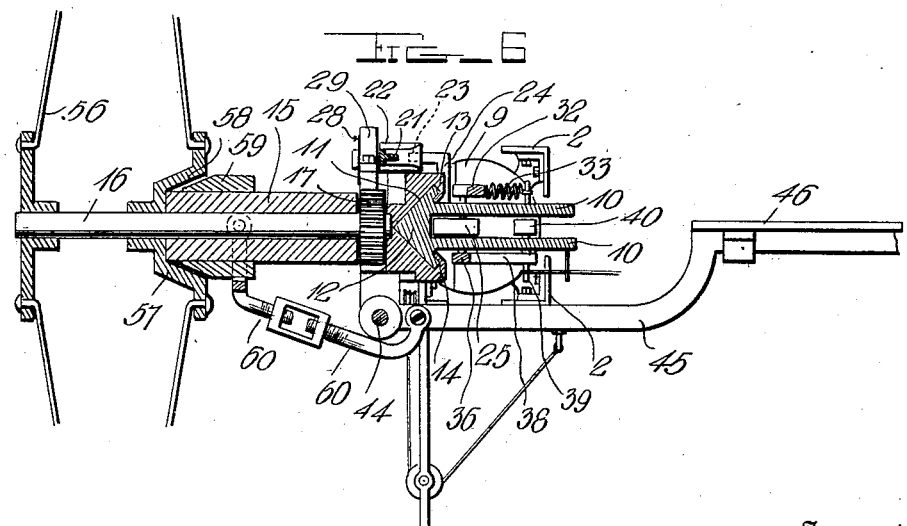

UNITED STATES PATENT OFFICE.

CARL S. AGRE AND BERNARD M. AGRE, OF VOLGA, SOUTH DAKOTA.

WINDMILL.

999,188.  Specification of Letters Patent.  Patented July 25, 1911.

Application filed July 14, 1910. Serial No. 571,993.

*To all whom it may concern:*

Be it known that we, CARL S. AGRE and BERNARD M. AGRE, citizens of the United States, residing at Volga, in the county of Brookings and State of South Dakota, have invented certain new and useful Improvements in Windmills; and we do declare the following to be a full, clear, and exact description of the invention, such as will enable others skilled in the art to which it appertains to make and use the same.

This invention relates to improvements in windmills.

The object of the invention is to improve and simplify the construction of the windmill shown in United States Patent No. 953,890 granted to Carl S. Agre April 5, 1910.

With this and other objects in view, the invention consists of certain novel features of construction, combination and arrangement of parts as will be more fully described and particularly pointed out in the appended claims.

In the accompanying drawings: Figure 1 is a side view of a windmill constructed in accordance with our invention; Fig. 2 is a similar view on an enlarged scale of the upper end of the tower and the head of the mill; Fig. 3 is a similar view of the opposite side; Fig. 4 is a rear view; Fig. 5 is a vertical longitudinal sectional view; Fig. 6 is a horizontal sectional view taken on a line with the windmill shaft; Fig. 7 is a top plan view of the upper end of the tower with the head removed; Fig. 8 is a horizontal sectional view through the upper portion of the tower. Fig. 9 is a detail horizontal section on the line 9—9 of Fig. 5. Fig. 10 is a side elevation of the upper end of the pump rod.

Referring more particularly to the drawings, 1 denotes the tower which is preferably constructed of angle iron corner bars 2, which incline inwardly from the lower toward the upper end of the tower as shown. The angle iron corner bars 2 are connected together at suitable intervals by horizontally disposed connecting bars 3 which are bolted to the corner bars thus securely holding the latter together. Between the ends of the brace bars 3 and the adjacent inner sides of the angle iron corner bars are arranged angle iron spacing plates 4 which are of less width than the angle iron bars 2 whereby the edges 5 of said corner bars project beyond the spacing plates and constitute guiding tracks down which the casing for the wind wheel gearing is adapted to slide as will be hereinafter more fully described. On the upper end of the tower is arranged a bearing plate 6 in which adjacent each corner of the tower is formed a segmental slot 7 the purpose of which will be hereinafter described. The bearing plate 6 is provided with a central passage 8 through which the pump rod is adapted to operate.

Revolubly mounted on the bearing plate 6 of the tower is a hollow wheel supporting head comprising a circular base plate 9 on which are arranged upwardly projecting parallel supporting plates 10 which are spaced apart and are integrally connected at one edge and at their upper ends as shown. On the integrally connected edges of the plates 10 is formed a track 11, said integrally connected edges and track being arranged at the angle or inclination of the corner bars of the tower so that when the head is swung around to bring the track opposite the upper end of any corner bar, the track will form practically a continuation of said bars whereby the wheel and gearing supporting mechanism may readily slide from the track onto the corner bar.

Slidably engaged with the track 11 is a gear and wind wheel supporting casing 12 having in its inner side a longitudinal groove corresponding in shape to the track. On one edge of the said groove is an integral guide flange 13 while at the opposite side the casing is provided with a detachable and adjustable track engaging flange 14 secured by bolts passing through horizontal slots therein as shown in Fig. 4 whereby it may be regulated or adjusted to take up any wear of the parts. Formed on and projecting laterally from the outer side of the casing 12 is a horizontally disposed shaft bearing 15 in which is revolubly mounted the wind wheel shaft 16. On the inner end of the shaft 16 and disposed in a space or slot between the shaft bearing and the adjacent outer face of the casing is a spur gear pinion 17 which is in operative engagement with a spur gear wheel 18, said wheel being revolubly mounted in a bearing bracket 19 formed on the wheel bearing 15 as shown.

On the gear 18 is arranged an eccentrically disposed wrist pin 20 to which is pivotally connected the upper end of a pitman 21, the lower end of which is provided with a beveled head 22 having formed in its inner side a socket 23 adapted to be engaged by a pump rod connecting arm 24 which is secured to the upper slotted end 25 of the pump rod 26. The arm 24 projects through and works in the opening 27 formed in the adjacent side or plate 10 of the head. The beveled head 22 on the lower end of the pitman 21 is provided on its outer side with an anti-friction roller 28 which is adapted to travel in a guide way 29 arranged on the adjacent portion of the gear casing as shown. By thus connecting the pump rod with the wheel operated gearing, said rod will be reciprocated when the wind wheel revolves. The upper end of the pump rod 26 is provided with a vertically disposed slot 30 which is engaged by a transversely disposed pin 31 fixed on the lower end of the arm 32 which is pivoted at its upper end on one side of the head and is engaged at its lower end by a coiled spring 33 which is arranged on and secured to the head by a stud or other suitable fastening device. On the portion of the pin 31 engaged by the slotted upper end of the pump rod is preferably arranged an anti-friction roller or sleeve 34 whereby said slotted upper end of the rod is free to reciprocate on said pin. The pin 31 extends through the opening 27 and the horizontally disposed slot 35 formed in the opposite side plates 10 of the head and the free projecting end of the pin is fitted in a retaining pawl or dog 36 at the angle of the same to constitute a pivot therefor.

The pawl 36 has one end normally held in engagement with a notch or recess 37 formed in the rear edge of the casing 12 whereby said casing is held in operative position on the head. The pawl 36 is provided with a right angularly projecting operating lug 38 which is connected by a pin 39 to the upper end of a holding rod 40 the lower end of which is slidably engaged with a guide aperture 41 formed in the base plate 9 of the head. Around the rod 40 is arranged a coiled spring 42 the pressure of which is exerted to normally hold the pawl 36 in yielding engagement with the notch or recess 37 in the casing 12 thereby supporting or holding said casing in an operative position on the head. Connected with the pin 39 is a releasing wire or cable 43 which extends downwardly through the base plate of the head and bearing plate 6 of the tower to the ground.

When the cable 43 is pulled to release the pawl 36, the lower end of the rod 40 will be projected through the guide aperture 41 in the base plate of the head and into one of the slots 7 formed in the bearing plate 6 on the upper end of the tower thereby fastening the head to the tower in a position wherein the track 11 of the head will be in line with one of the corner bars of the tower.

On one side of the casing 12 is arranged a vertical bearing bolt 44 on which is pivotally mounted the inner end of a vane arm 45 having on its outer end the usual or any suitable form of vane 46. The vane arm is connected with a suitable brace and is engaged by one end of a coiled vane opening spring 47 which is arranged on the bearing bolt 44 and has its opposite end connected with the casing 12. The pressure of the spring 47 when thus arranged is applied to the vane arm to swing and hold the vane in an open and operative position. To the vane arm is connected the upper end of a wheel raising and lowering cable 48 which passes around guide pulleys 49 journaled in a guide arm 50 secured to one side of the casing and projecting laterally therefrom. The cable, after passing through the pulleys 49 passes upwardly and around a guide pulley 51 mounted in a suitable bracket on the upper end of the head and thence extends downwardly to a windlass arranged in the lower portion of the tower, said windlass comprising a winding drum 52 having on one end a worm gear 53 which is engaged by a worm 54 provided with a crank handle 55 whereby said winding drum may be revolved in the proper direction for winding and unwinding the cable 48 and thereby raising or lowering the wheel and operating gearing of the mill.

Fixedly mounted on the outer end of the wheel shaft 16 is a wind wheel 56 which may be of any suitable construction and which is provided with an inner hub 57 having formed in its outer end a tapered socket 58 into which the inner end of the bearing 15 projects. The socket 58 is of greater diameter than the bearing 15 and thus provides a space around said bearing adapted to receive a tapered brake sleeve 59 whereby when said sleeve is forced outwardly on the bearing 15 and into engagement with the walls of the socket 58 the movement of the wheel will be retarded or stopped. Said sleeve 59 and hub 57 thus form a clutch for stopping the movement of the wheel. The brake sleeve 59 is connected to the vane arm 45 by an operating rod 60 which is preferably formed in sections connected by a turn buckle whereby the length of the rod may be increased or decreased when desired. The outer end of the rod 60 is preferably bifurcated and said bifurcated end is pivotally connected with the inner end of the brake sleeve as shown. By thus connecting the vane with the brake sleeve of the wind wheel and connecting the raising and lowering cable with the vane arm it will be readily seen that when the raising and lowering cable is drawn upon, the vane will be swung around to an inoperative position which movement of the vane will engage the brake sleeve with the hub of the wheel thereby stopping the movement of the same while the wheel gear and casing are being raised or lowered.

By beveling the head 22 on the lower end of the pitman 21 the end of the pump connecting arm 24 will, when the gear casing 12 and the mechanism connected therewith is raised into engagement with the head in the manner described, spring into engagement with the socket 23 of said head thereby automatically connecting the pitman rod with the pump rod. When the cable 43 is pulled downward, the pawl 36 will be released from the casing and at the same time sufficient movement will be imparted to the upper end of the pump rod through the pin 31 to withdraw the arm 24 from the socket 23. The casing 12 and the parts carried thereby may then be lowered by the unwinding of cable 48 from the windlass 52 as will be readily understood. When the downward strain on the cable 43 is released the spring 33 will return the pawl 32 and the upper end of the pump rod to their normal positions so that when the casing 12 is again raised to the upper end of the tower, the arm 24 will automatically engage the socket 23 and the pawl 32 will engage the casing.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described our invention, what we claim is:

1. The combination of a tower comprising angle iron corner bars, braces connected to the corner bars, and spacing blocks between the braces and the corner bars terminating short of the edges of said bars, a head revolubly mounted on the tower and having a track on one side adapted to aline with a corner bar of the tower, a casing slidably mounted on said track and adapted to slidably engage the corner bar, driving mechanism carried by said casing, means for raising and lowering said casing, and means for maintaining the casing normally in its raised position.

2. The combination of a tower, a head revolubly mounted thereon and having a track on one side, a casing provided in one side with a groove engaging said track, and a fixed overhanging flange at one side of said groove engaging the head, an adjustable flange at the opposite side of the groove also engaging the head, a windwheel carried by said casing and means for raising and lowering the casing.

In testimony whereof we have hereunto set our hands in presence of two subscribing witnesses.

CARL S. AGRE.
BERNARD M. AGRE.

Witnesses:
HENRY LARSON,
CHAS. LEE.

Copies of this patent may be obtained for five cents each, by addressing the "Commissioner of Patents, Washington, D. C."